United States Patent
Ito

(10) Patent No.: US 8,488,222 B2
(45) Date of Patent: Jul. 16, 2013

(54) IMAGE PROCESSING METHOD, AND COMPUTER-READABLE STORAGE MEDIUM FOR COMPUTER PROGRAM

(75) Inventor: Atsushi Ito, Yawata (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 757 days.

(21) Appl. No.: 12/721,875

(22) Filed: Mar. 11, 2010

(65) Prior Publication Data

US 2010/0238516 A1    Sep. 23, 2010

(30) Foreign Application Priority Data

Mar. 19, 2009    (JP) ................................. 2009-068528

(51) Int. Cl.
*H04N 1/46* (2006.01)
*H04N 1/04* (2006.01)
*G03G 15/00* (2006.01)
*G03G 15/22* (2006.01)

(52) U.S. Cl.
USPC ........... 358/531; 358/488; 358/498; 399/395; 399/401; 399/364; 399/306

(58) Field of Classification Search
USPC .................. 358/531, 488, 498; 399/395, 401, 399/364, 306
See application file for complete search history.

(56) References Cited

U.S. PATENT DOCUMENTS

| 2007/0070470 | A1 | 3/2007 | Takami et al. |
| 2007/0127964 | A1* | 6/2007 | Okamoto et al. ............. 399/395 |
| 2007/0139707 | A1 | 6/2007 | Takami et al. |
| 2010/0110506 | A1* | 5/2010 | Katou et al. .................. 358/488 |

FOREIGN PATENT DOCUMENTS

| JP | 07-093195 | 4/1995 |
| JP | 07-175811 | 7/1995 |
| JP | 07-182491 | 7/1995 |
| JP | 08-279918 | 10/1996 |
| JP | 11-327738 | 11/1999 |
| JP | 2004-104226 | 4/2004 |
| JP | 2005-057603 | 3/2005 |
| JP | 2005-149114 A | 6/2005 |
| JP | 2006-054715 | 2/2006 |
| JP | 2006-135743 | 5/2006 |
| JP | 2007-110676 A | 4/2007 |
| JP | 2007-124349 | 5/2007 |
| JP | 2007-185943 A | 7/2007 |
| JP | 2008-187313 | 8/2008 |

OTHER PUBLICATIONS

Office Action (Notification of Reason(s) for Refusal) dated Mar. 29, 2011, issued in the corresponding Japanese Patent Application No. 2009-068528, and an English Translation thereof.

* cited by examiner

*Primary Examiner* — Charlotte M Baker
(74) *Attorney, Agent, or Firm* — Buchanan Ingersoll & Rooney PC

(57) ABSTRACT

An image processing apparatus is provided which performs a correction process in such a manner that a geometrical arrangement of images of a plurality of pages of image data is approximated to a predetermined appropriate geometrical arrangement. The image processing apparatus causes a display to display a list of information indicating degrees of correction on the individual pages to be performed by an image processing portion.

12 Claims, 15 Drawing Sheets

FIG. 7A

```
📁 Chapter1
 ├─ 📄 Page1    +5.1°
 ├─ 📄 Page3    -3.2°
 ├─ 📄 Page7    +2.7°
 ├─ 📄 Page8    +0.6°
 ├─ 📄 Page4    +0.6°
 ├─ 📄 Page6    +0.6°
 └─ 📄 Page15   +0.5°
```

FIG. 7C

```
📁 Chapter1
 ├─ 📄 Page14      +5.1°
 ├─ 📄 Page3       -3.2°
 ├─ 📄 ▓▓▓▓▓       +2.7°
 ├─ 📄 Page8       +0.6°
 ├─ 📄 Page4       +0.6°
 ├─ 📄 Page6       +0.6°
 └─ 📄 Page15      +0.5°
```

IMAGE PROCESSING METHOD, AND
COMPUTER-READABLE STORAGE
MEDIUM FOR COMPUTER PROGRAM

This application is based on Japanese patent application No. 2009-068528 filed on Mar. 19, 2009, the contents of which are hereby incorporated by reference.

BACKGROUND OF THE INVENTION

1. Field of the Invention

The present invention relates to a method, an apparatus, and the like for image processing.

2. Description of the Related Art

In many cases, software for capturing an image from a scanner and inputting the image to a computer has an image processing function to correct an inclination of the image. In the case where a scanner provided with an automatic document feeder (ADF) is used to continuously scan a document containing a plurality of pages, images whose number corresponds to the number of pages of the document are input to the computer in the form of one file. The software serves to determine an inclination of an image for each page and correct the image of each page when the file is input to the computer, or in response to a subsequent command entered by a user.

The result of automatic inclination correction is not always satisfactory to the user. It is possible that, for example, correction is erroneously made, insufficient correction is made, or excessive correction is made on an image of a page for which inclination correction is unnecessary, because, for example, the image pattern of the page has a diagonal contour. To cope with this, software for correcting an inclination is configured to display an image that has been subjected to inclination correction on a display.

In general, images that have been subjected to inclination correction are sequentially displayed page by page. The top page is displayed first. When a user performs a predetermined operation, display on the screen is changed from one page image to another. The user can look at an image of one page displayed, and check whether or not an inclination correction process has been performed appropriately on the image.

If the user determines that inclination correction this time has not been performed appropriately on an image of a page, then inclination correction is performed once again thereon. In performing inclination correction once again, an inclination angle of the image is determined based on, for example, a document element specified by the user. Such a document element is a character string, a ruled line, a picture, a photograph, or the like. There is disclosed an image processing apparatus for displaying, around a document element, a value indicating the reliability of calculation of an inclination angle of the document element. Such a value is displayed for the convenience of the user specifying a document element (Japanese Laid-open Patent Publication No. 2005-149114).

As for display of images of a plurality of pages, a technique is known in which the background portions of the individual pages are made transparent, and the pages are displayed one above another. For example, there is disclosed an image forming apparatus having a finishing function to staple printed documents together or to punch a hole therein (U.S. Patent Application Publication Nos. 2007/0139707 and 2007/0070470). The image forming apparatus has an operational panel on which preview for finishing is made by using the technique described above. A user of the image forming apparatus looks at the preview thus made; thereby, for example, he/she can check whether or not a plurality of pages contain a page that does not have a margin necessary to staple documents together.

Unfortunately, the conventional methods for displaying the result of image processing on images of a plurality of images have the following disadvantages.

According to the display method in which images that have been subjected to an inclination correction process or another image processing are sequentially displayed page by page, it is necessary for an operator to view all the pages to check whether or not there is a page on which the inclination correction process or another image processing has not been performed appropriately. For this reason, the greater the number of pages of a document is, the heavier load on an operator is. If images of a plurality of pages or all the pages are displayed at one time, a task of changing a display to another display is reduced. In such a case, however, the size of images of the individual pages to be displayed is small, which makes it difficult for an operator to check whether or not there is a page on which the inclination correction process or another image processing has not been performed appropriately.

According to the display method in which the background portions of a plurality of pages are made transparent and the pages are displayed one above another, even if there is a page on which image processing has not been performed appropriately, it is impossible for an operator to easily specify the page number of such a page. Further, as the number of pages is greater, the details to be displayed become more complicated, so that it is difficult to identify the individual pages.

SUMMARY

The present disclosure is directed to solve the problems pointed out above, and therefore, an object of an embodiment of the present invention is to reduce a burden on an operator who visually confirms whether or not image processing is performed appropriately on images of a plurality of pages.

According to an aspect of the present invention, an image processing method for performing image processing on image data including a plurality of pages is provided. The image processing method includes correcting images of the individual pages of the image data in such a manner that a geometrical arrangement of the images is approximated to a predetermined appropriate geometrical arrangement, and displaying a list of information on a display. The information indicates degrees of correction to be performed by an image processing portion on the individual pages of the image data. Examples of image correction for approximating the geometrical arrangement of an image to a predetermined appropriate geometrical arrangement include inclination correction, flip vertical, flip horizontal, and margin adjustment.

Preferably, the image processing method further includes displaying, on the display in which the list of the information and the icons representing pages are displayed, images of two or more selected pages one above another in such a manner that the images are displayed in different colors on a page-by-page basis, and the image of a farther page is visible through a background portion of a closer page.

These and other characteristics and objects of the present invention will become more apparent by the following descriptions of preferred embodiments with reference to drawings.

BRIEF DESCRIPTION OF THE DRAWINGS

FIGS. 7A-7D are diagrams illustrating an example of the relationship between selection of a plurality of pages and arrangement order of images of the selected pages.

DESCRIPTION OF THE PREFERRED EMBODIMENTS

Figure 1:
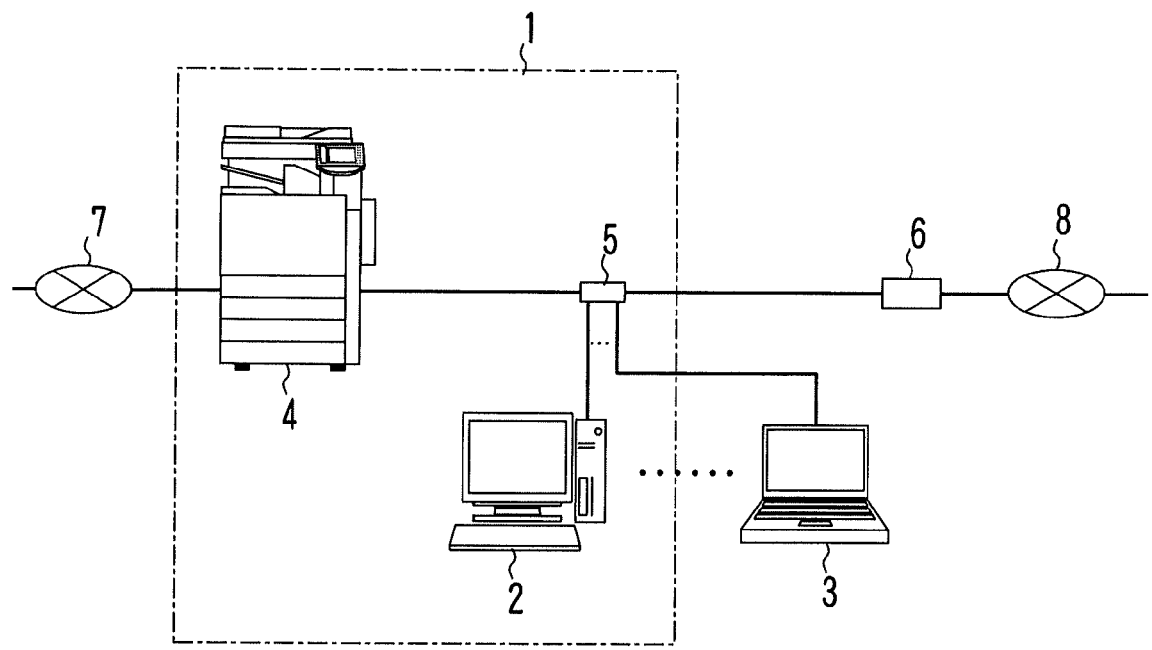
FIG. 1 is a diagram illustrating an example of the configuration of an image processing system according to an embodiment of the present invention.

An image processing system 1 illustrated in FIG. 1 is a part of a Local Area Network (LAN) installed in offices of business or offices of organizations similar thereto. The LAN is provided with a plurality of personal computers 2 and 3, and a multifunction device 4 called a Multifunction Peripheral (MFP). The LAN is connected to a public line 7 through the multifunction device 4, and connected to the Internet 8 through a router 6. The personal computers 2 and 3, and the multifunction device 4 are configured to communicate with one another through a switching hub 5. Of the LAN, the personal computer 2 and the multifunction device 4 are included in the image processing system 1.

The personal computer 2 functions as an image processing apparatus by executing an image processing program that is application software. The program may be installed on an auxiliary storage device equipped in the personal computer 2, or may not be installed thereon. In the case where the program is not installed thereon, a program read out from a removable medium or downloaded from a server via a communication line is executed. Hereinafter, the personal computer 2 is called an "image processing apparatus 2".

The multifunction device 4 is provided with a scanner for scanning an image represented on a paper document. The scanner outputs image data to be subjected to image processing. The multifunction device 4 is capable of transmitting, to the image processing apparatus 2, image data received through facsimile communication and image data read out from a document storage memory called a box, in addition to image data obtained by the scanner.

The image processing apparatus 2 performs, on image data of a plurality of pages obtained from the multifunction device 4, other equipment in the LAN, or a web site, image processing for correcting inclinations of images depicted on the individual pages. Such image processing is hereinafter referred tows "inclination correction". The inclination correction is one kind of "correction for approximating the geometrical arrangement of an image to a predetermined appropriate geometrical arrangement". The appropriate geometrical arrangement in the inclination correction is the geometrical arrangement for which a viewer accepts that characters or image patterns are not inclined. The appropriate geometrical arrangement is, for example, the geometrical arrangement where, in horizontal writing, there is no or little difference between the direction along which a character string is represented and the horizontal direction of a page. In performing the inclination correction, an inclination angle of an image with respect to the horizontal or vertical direction of a page is calculated. Thereafter, the image is rotated in such a manner to cancel the inclination.

Figure 2:
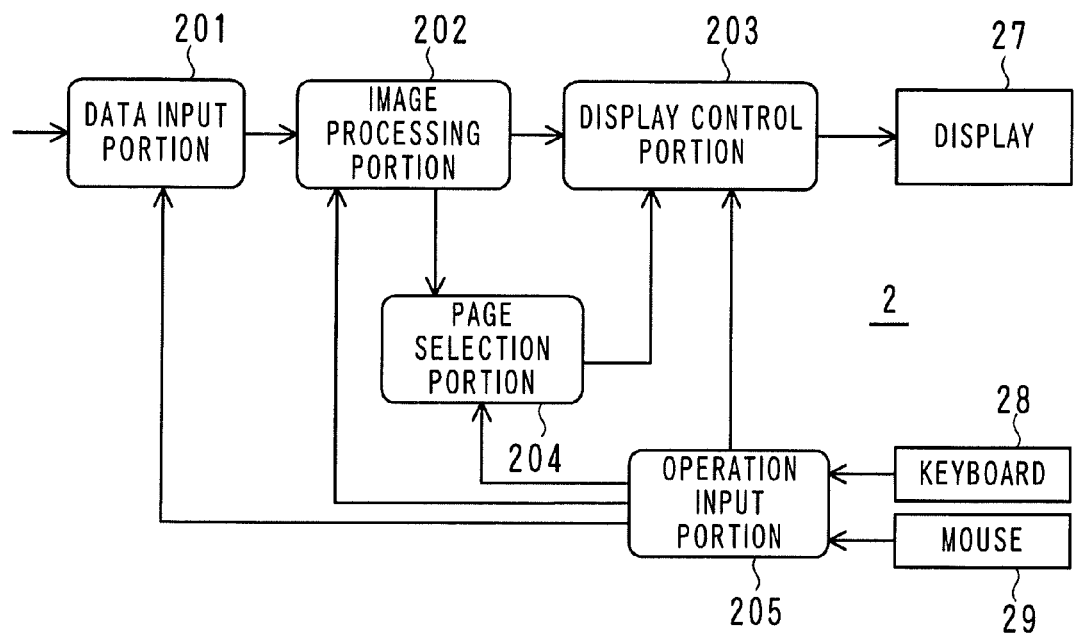
FIG. 2 is a diagram illustrating an example of the functional configuration of an image processing apparatus.

Referring to FIG. 2, the image processing apparatus 2 is configured of a data input portion 201, an image processing portion 202, a display control portion 203, a page selection portion 204, an operation input portion 205, and the like. These functional portions are implemented by an image processing program and a Central Processing Unit (CPU) that functions as a computer to execute the image processing program. The image processing apparatus 2 is further configured of a display 27, a keyboard 28, and a mouse 29 serving as a pointing device.

With the image processing apparatus 2, the image processing portion 202 performs an inclination correction process on image data that is obtained by the data input portion 201, and contains one or more pages. The display control portion 203 controls the display 27 to display, on a screen thereof, images of pages that have been subjected to the inclination correction process. If there are a multiple of pages, images of predetermined number of pages selected by the page selection portion 204, e.g., images of three pages, are displayed instead of displaying images of all the pages at one time. Together with the display of images, values indicating degrees (angles) of the inclination correction on the individual pages are displayed in the form of a list as reference information for a user to make a determination.

The user designates from where the data input portion 201 is to obtain image data, and informs the data input portion 201 of the designation through the operation input portion 205. The data input portion 201 obtains image data, in accordance with the designation, from the multifunction device 4, another external device, or a storage device provided in a personal computer realizing the image processing apparatus 2. The following description is a typical example in which image data is obtained from the scanner of the multifunction device 4. However, image data to be subjected to an inclination correction process is not limited to image data transmitted from the scanner, because it is possible that an image received through facsimile transmission is inclined, or that a copied document is accumulated with an image inclined.

The processing flow of the image processing apparatus 2 will be detailed with reference to FIG. 2 and the flowchart of FIG. 3.

Figure 3:
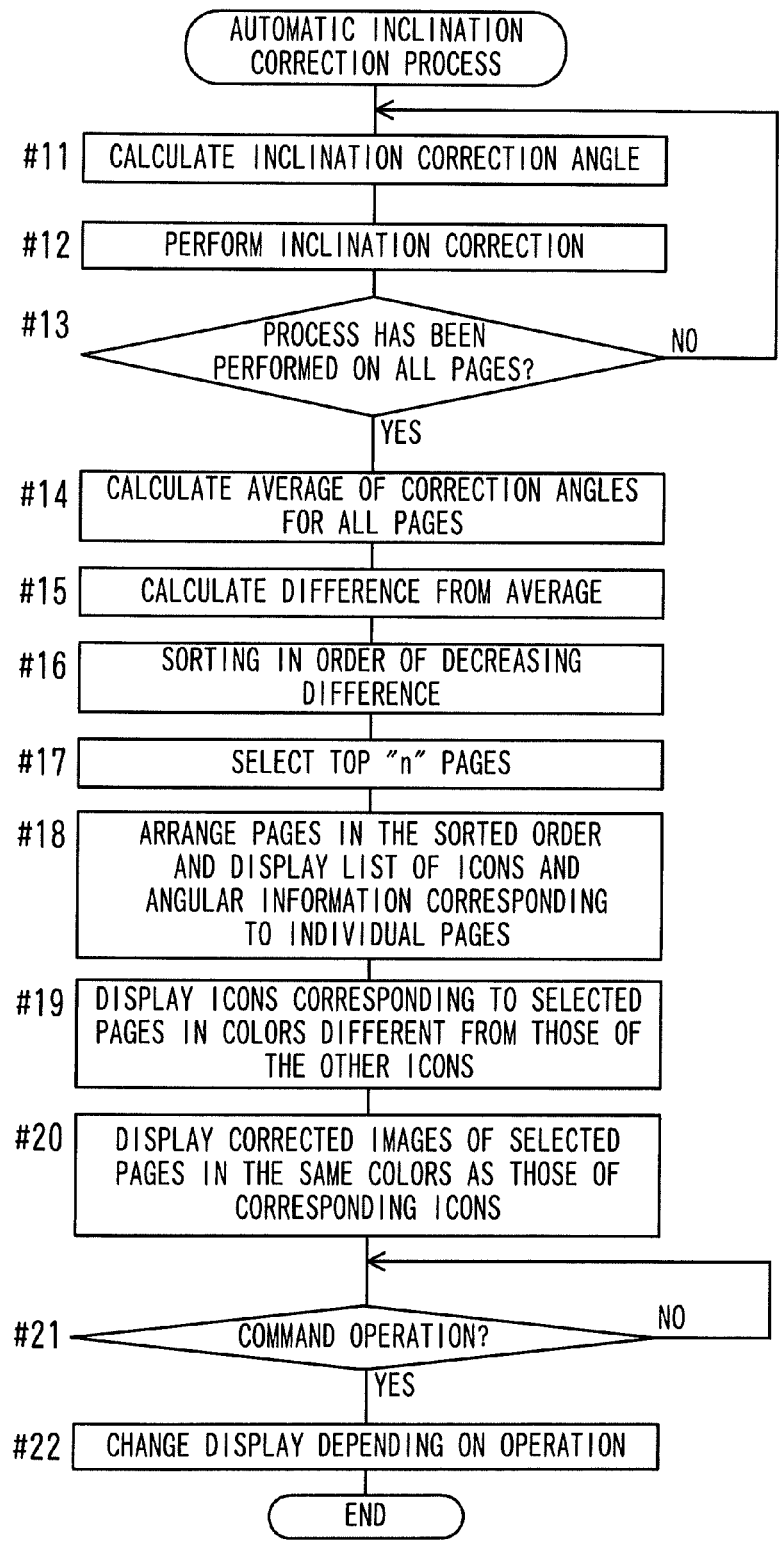
FIG. 3 is a flowchart illustrating an example of the processing flow of an image processing apparatus.

The process performed by the image processing portion 202 corresponds to the process of Step #11 to Step #13 of FIG. 3. The image processing portion 202 selects, as a target of an automatic inclination correction process, all the pages of image data contained in one file. Then, the image processing portion 202 calculates an inclination correction angle for each page and rotates an image of the page by an amount of the inclination correction angle. This process is performed on individual pages at one time. General techniques may be used to calculate an inclination correction angle. For example, the geometrical arrangement of pixels is approximated by straight lines to define a rectangular shape circumscribing a character string or an image pattern. Then, an inclination angle of a side of the rectangular shape with respect to the outline of the page is calculated. A plurality of rectangular shapes are defined for each page, and the average of inclination angles calculated for the individual rectangular shapes is used as an inclination angle of the page. An inclination correction angle is an angle whose measure is equal to that of an inclination angle and whose direction is opposite thereto. Note that a method for detecting an inclination based on run-length encoded image data may be used to calculate an inclination correction angle (see Japanese Laid-open Patent Publication No. 2005-010886, for example).

The process performed by the page selection portion 204 corresponds to the process of Step #14 to Step #17 of FIG. 3. The page selection portion 204 obtains, from the image processing portion 202, a plurality of pieces of inclination correction angle data corresponding to all the pages. Then, the page selection portion 204 calculates the average of the inclination correction angles of all the pages, and a difference between the average thus calculated and the inclination correction angle of each of the pages. Thereafter, the page selection portion 204 sorts all the pages in order of decreasing difference from one having a higher difference (to be exact, a high absolute value of the difference). Then, the page selection portion 204 selects, as display targets, "n" pages in order from the page having the highest difference, wherein "n" is defined as 2 or more. In this example, the page selection portion 204 selects three pages as display targets. If image data contained in one file has pages less than "n" pages, then the page selection portion 204 selects all the pages as display targets.

The process performed by the display control portion 203 corresponds to the process of Step #18 to Step #20 of FIG. 3. The display control portion 203 arranges the differences as information indicating degrees of inclination correction in the order sorted by the page selection portion 204, and displays the differences in the form of a list. To "display" herein means "generating a screen for display made on the display 27". The same applies to the descriptions hereinafter. In displaying the list, each of the differences is associated with an icon to which the page number is given; thereby to indicate to which page the difference corresponds. The display control portion 203 further performs a process for distinguishing icons corresponding to the pages selected by the page selection portion 204 from the other icons corresponding to unselected pages. For example, the display control portion 203 colors the icons corresponding to the selected pages in different colors, e.g., black, blue, and red in order of decreasing difference from a page having a higher difference. The display control portion 203 also performs a process for arranging images, which have been subjected to the inclination correction process, of the pages selected by the page selection portion 204, one above another, and displaying the images in such a manner that an image of a farther page is visible through the background portion of a closer page. Stated differently, the background portions of pages are made transparent; thereby display is made in such a manner that an image of a farther page is visible through superimposed images of closer pages. Hereinafter, such a display format is referred to as "transmissive composite display", and an image displayed in such a format is referred to as a "transmissive composite image". The transmissive composite display is realized by known image data processing for virtual drawing on a display screen in which values of pixels of an image on a closer layer are selected as values of individual pixels where the image is overlapped with an image of a farther layer. Images are displayed in different colors on a page-by-page basis in order to show individual relationships between images and page numbers to a user viewing the display. The color of an image is the same as that of an icon corresponding to a page on which the image is depicted.

In this way, after displaying the list of differences and images of pages having higher degrees of inclination correction, the image processing apparatus 2 waits for the user to give instructions (#21). The user can display, if necessary, images of another page that have been subjected to the inclination correction process.

If the user determines that further checking is unnecessary, then he/she instructs the image processing apparatus 2 to finish the display for checking. In response to the operation performed by the user, the image processing apparatus 2 changes the indication on the display (#22).

The following is an example of an operational screen displayed on the display 27.

Figure 4:
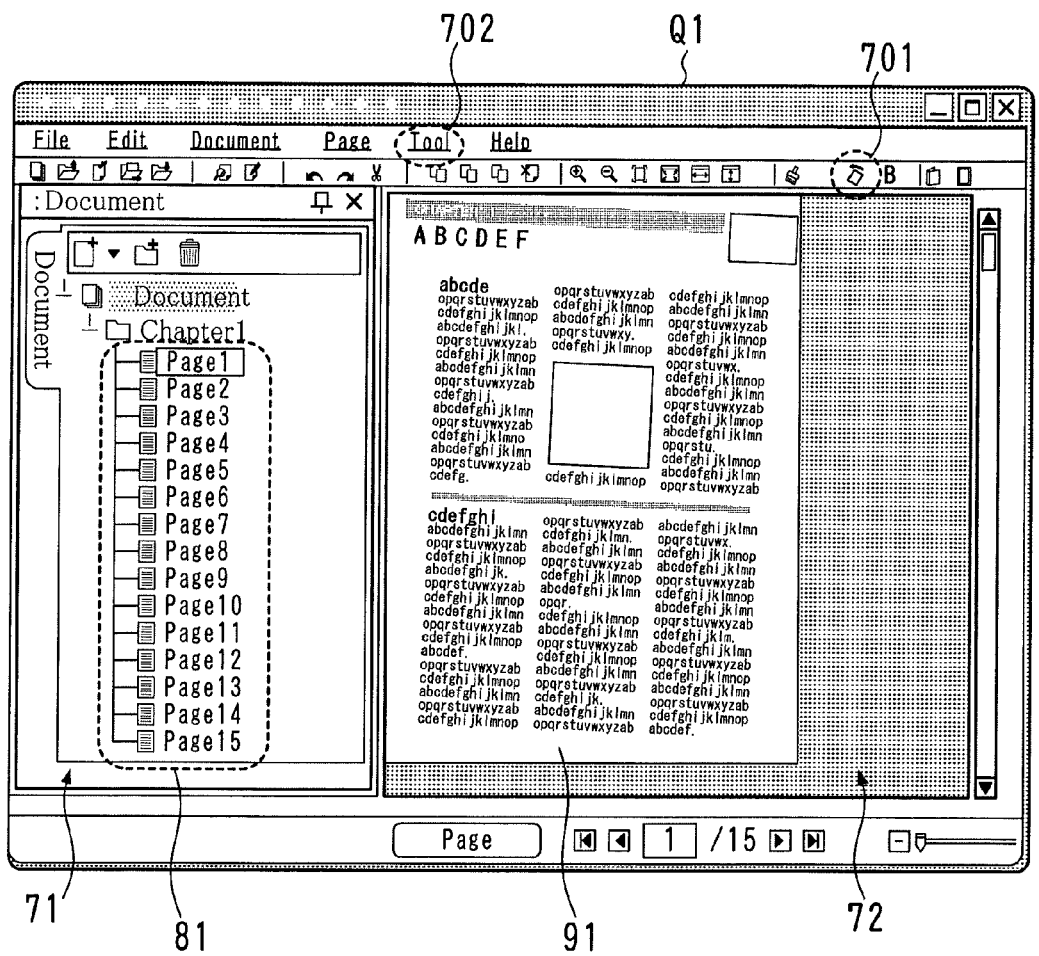
FIG. 4 is a diagram illustrating an example of display made on an operational input screen before instructions to execute an inclination correction process are given.

When the data input portion 201 obtains image data, an operational input screen Q1 shown in FIG. 4 is displayed. The operational input screen Q1 has an area for displaying menus and tools for operation, an area for displaying the status, a tree display area 71 for displaying a hierarchical tree indicating a file structure, and a monitoring display area 72 for displaying a page image. In the illustrated example of FIG. 4, the tree display area 71 displays a hierarchical tree of a file named "Chapter 1" having fifteen pages. The "Chapter 1" file has an icon group 81 including fifteen icons to which characters representing page numbers are given. Referring to the icon group 81, a square surrounding characters of a page number means that the page corresponding to the page number is selected. The top page "Page 1" is selected in the illustrated example. A pre-corrected image 91 of the selected page, i.e., an image at a time when the image data thereof has been obtained by the data input portion 201, is displayed in the monitoring display area 72. The user can display another image by specifying another page. Displaying another page is made by, for example, moving the mouse pointer (not shown) to the tree display area 71 and selecting a desired icon.

When the user clicks on a tool icon 701 on the operational input screen Q1, an inclination correction process is performed. In order to start the inclination correction process, the user may specify an icon 702 in the menu bar by clicking thereon with the mouse or through keyboard input, and select an inclination correction process from the pull-down menu displayed in response to the click or input operation. After performing the inclination correction process, the operational input screen Q1 is replaced with an operational input screen Q2 shown in FIG. 5.

Figure 5:
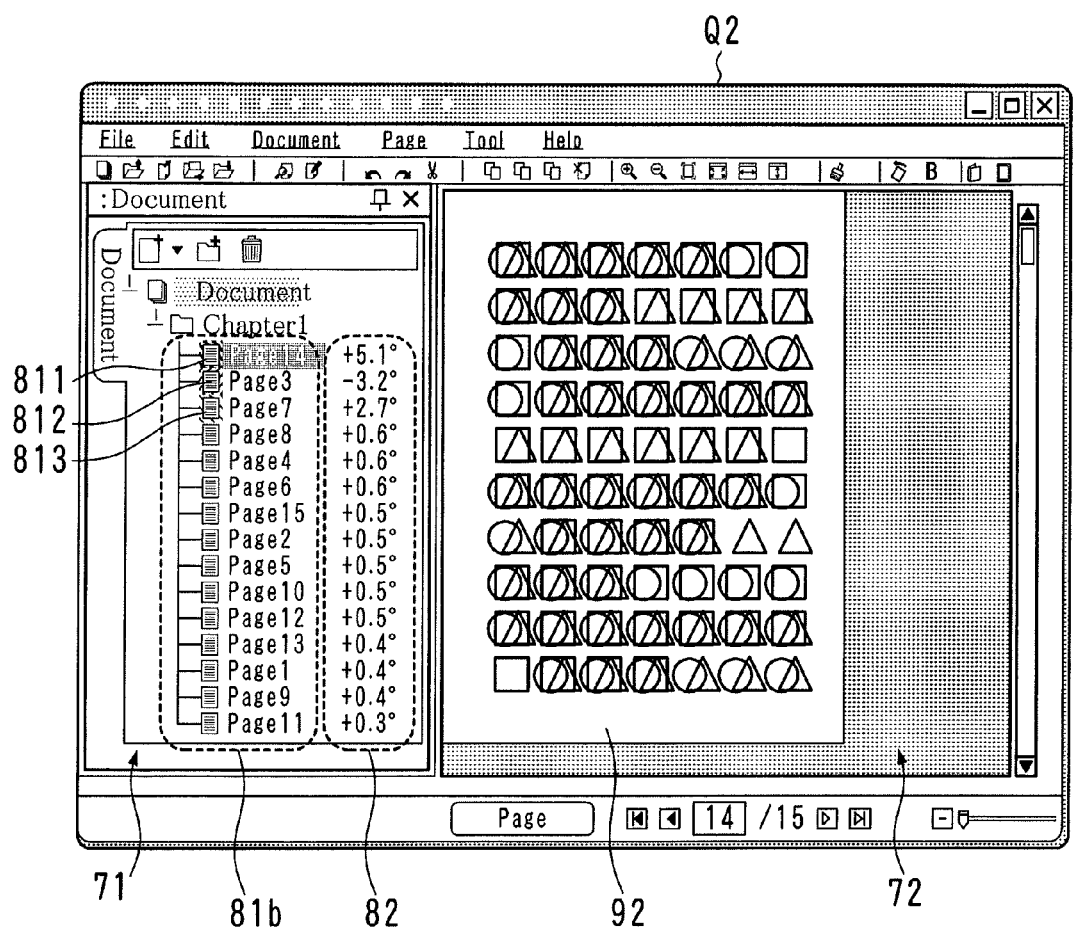
FIG. 5 is a diagram illustrating an example of display made on an operational input screen after a process in response to instructions to execute an inclination correction process is finished.

Referring to FIG. 5, an icon group 81b and a difference group 82 are displayed in a tree display area 71 of the operational input screen Q2. The icon group 81b has icons arranged in the order sorted by the page selection portion 204 as described above. The difference group 82 is made up of differences indicating degrees of inclination correction performed on the individual pages as described above. The icons of the icon group 81b are presented in different colors. An icon 811 corresponding to the page having the highest difference is colored in black. An icon 812 corresponding to the page having the second highest difference is colored in blue. An icon 813 corresponding to the page having the third highest difference is colored in red. Icons corresponding to the other pages are colored in gray. The individual differences are indicated adjacent to the right of icons named the corresponding pages, so that the individual differences are associated with the corresponding pages.

A transmissive composite image 92 is displayed in the monitoring display area 72 of the operational input screen Q2. The transmissive composite image 92 is a composite image obtained, as described earlier, by superimposing images of three pages that have been subjected to the inclination correction process (pages 14, 3, and 7). The three pages are selected from among all the pages by the page selection portion 204 in order of decreasing difference from one having a higher difference. The images constituting the transmissive composite image 92 are displayed in different colors (not shown in the drawing) on a page-by-page basis. The colors of the page images constituting the transmissive composite image 92 are the same as those of the icons 811, 812, and 813 of the corresponding pages in the tree display area 71.

Figure 6:
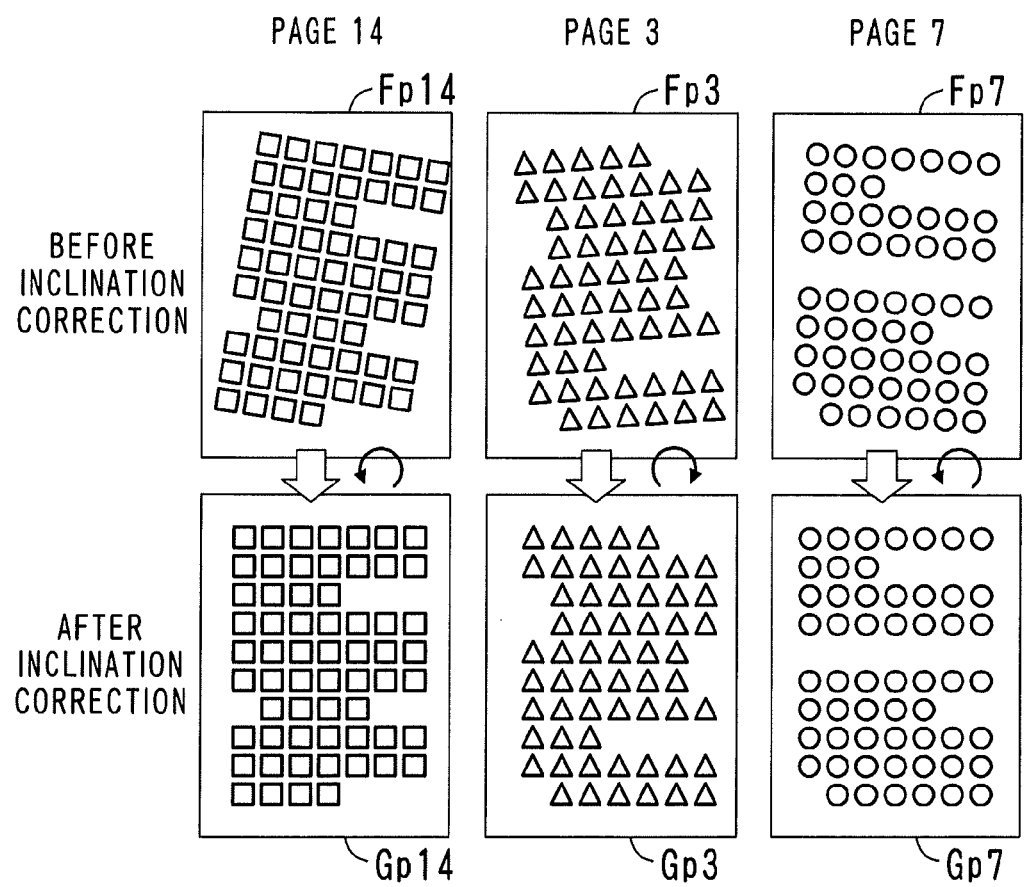
FIG. 6 is a diagram illustrating an example of a geometrical arrangement of images of a plurality of pages corresponding to the example of FIG. 5.

The transmissive composite image 92 is a combination of images Gp14, Gp3, and Gp7 exemplarily illustrated in FIG. 6. The images Gp14, Gp3, and Gp7 are images as a result of the inclination correction process on the images Fp14, Fp3, and Fp7, respectively. In the illustrated example, the images Gp14, Gp3, and Gp7 that have been subjected to the inclination correction process are not inclined, which means that the inclination correction process has been appropriately performed on the images Fp14, Fp3, and Fp7.

Referring back to FIG. 5, the differences are displayed in the form of a list. This enables the user to know degrees of inclination correction on the individual pages. The user thus can immediately determine whether or not there is a page having a very high degree of inclination correction, or a page that has been subjected to inclination correction in a direction different from the direction of inclination correction on the other pages. Since the transmissive composite image 92 corresponding to pages having a higher degree of inclination correction is displayed, the user can check whether the inclination correction having a high degree is appropriately-corrected inclination or inappropriately-corrected inclination. As described above, the images constituting the transmissive composite image 92 are displayed in different colors on a page-by-page basis, and the icons of the icon group 81b are presented in different colors. Thereby, if the user finds a page containing an inclined image in the transmissive composite image 92, i.e., a page on which inappropriate correction has been performed, he/she can easily know the page number of such a page merely by looking at the icon presented in the same color as that of the inclined image without performing any further operation.

Figure 7B:
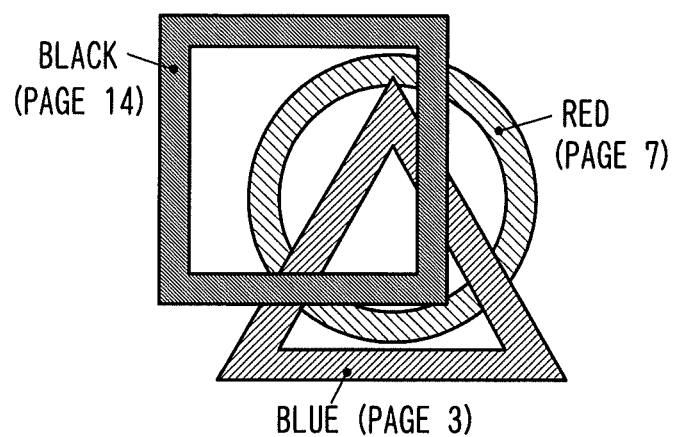
Figure 7D:
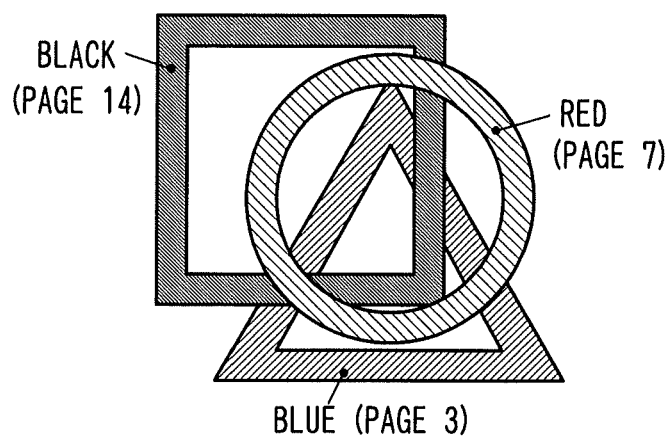

The user can change the positional relationship of pages in the transmissive composite image 92. Initially, as illustrated in FIGS. 7A and 7B, a page having the highest difference is geometrically arranged as the top-most page, and a page having a lower difference is geometrically arranged as a farther page. As illustrated in FIGS. 7C and 7D, if a page other than the page having the highest difference is specified out of the three pages corresponding to the transmissive composite image 92, then the specified page is geometrically arranged as the top-most page, and the other two pages are geometrically arranged, from front to rear, in order of decreasing difference from one having a higher difference. Referring to the tree display of each of FIGS. 7A and 7C, the page number of the top-most page image among the superimposed images is highlighted.

In the case where a page other than the three pages automatically selected and corresponding to the transmissive composite image 92 is specified, an image of the specified page that has been subjected to the inclination correction process is displayed in the monitoring display area 72. If a plurality of pages are specified at this time, then images of the specified pages are displayed one above another.

The user views the display made on the operational input screen Q2 and determines whether or not further checking is necessary. Then, the user gives instructions to the image processing apparatus 2 in accordance with the result of the determination. If the user determines that further checking is unnecessary, then he/she performs operation for finishing the process performed by the image processing apparatus 2. For example, causing the image processing apparatus 2 to start an OCR program for converting image data into text data, or to save image data corresponds to an operation for completing the automatic inclination correction process. In contrast, if the user determines that further checking is necessary, then he/she inputs information to the effect that checking has been made on the page displayed in the monitoring display area 72.

Figure 8:
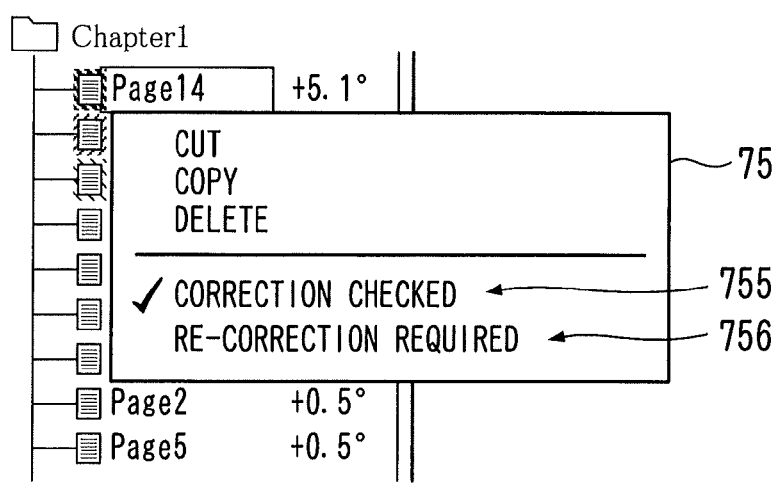
FIG. 8 is a diagram illustrating an example of an operation, performed by a user, to enter the result of determination on an inclination correction process.

FIG. 8 shows an example of input operation for checking. When the user selects a page in the tree display area by, for example, clicking the right mouse button, then a context menu 75 appears. If the user determines that there is no problem with the inclination correction process performed on the selected page, then he/she clicks on a character string 755, so that "correction checked" is set for the selected page. In contrast, if the user determines that there is a problem with the inclination correction process performed on the selected page, then he/she clicks on a character string 756, so that "re-correction required" is set for the selected page. Further, setting such as "cancel correction" may be prepared in the context menu 75 for a case where an inclination correction process has erroneously been performed.

A page for which "correction checked" setting has been performed is excluded from the display of a transmissive composite image displayed in the monitoring display area 72. Referring to an operational input screen Q3 of FIG. 9, the top six pages having a higher difference are excluded from the display of a transmissive composite image 93, and the transmissive composite image 93 consisting of images of the pages having the seventh, eighth, and ninth highest differences is displayed in the monitoring display area 72. Some icons of an icon group 81c and some differences of a difference group 82c are underlined in the tree display area 71. This means that pages corresponding to the underlined icons and the underlined differences are pages for which the "correction checked" setting has been performed. Out of the three pages whose images are displayed in the monitoring display area 72, an icon 814 corresponding to the page having the highest difference is colored in black. An icon 815 corresponding to the page having the second highest difference is colored in blue. An icon 816 corresponding to the page having the third highest difference is colored in red. Icons corresponding to the other pages are colored in gray. The images of the transmissive composite image 93 are displayed in different colors on a page-by-page basis. The colors of the page images constituting the transmissive composite image 93 are the same as those of the icons 814, 815, and 816 of the corresponding pages in the tree display area 71.

Figure 9:
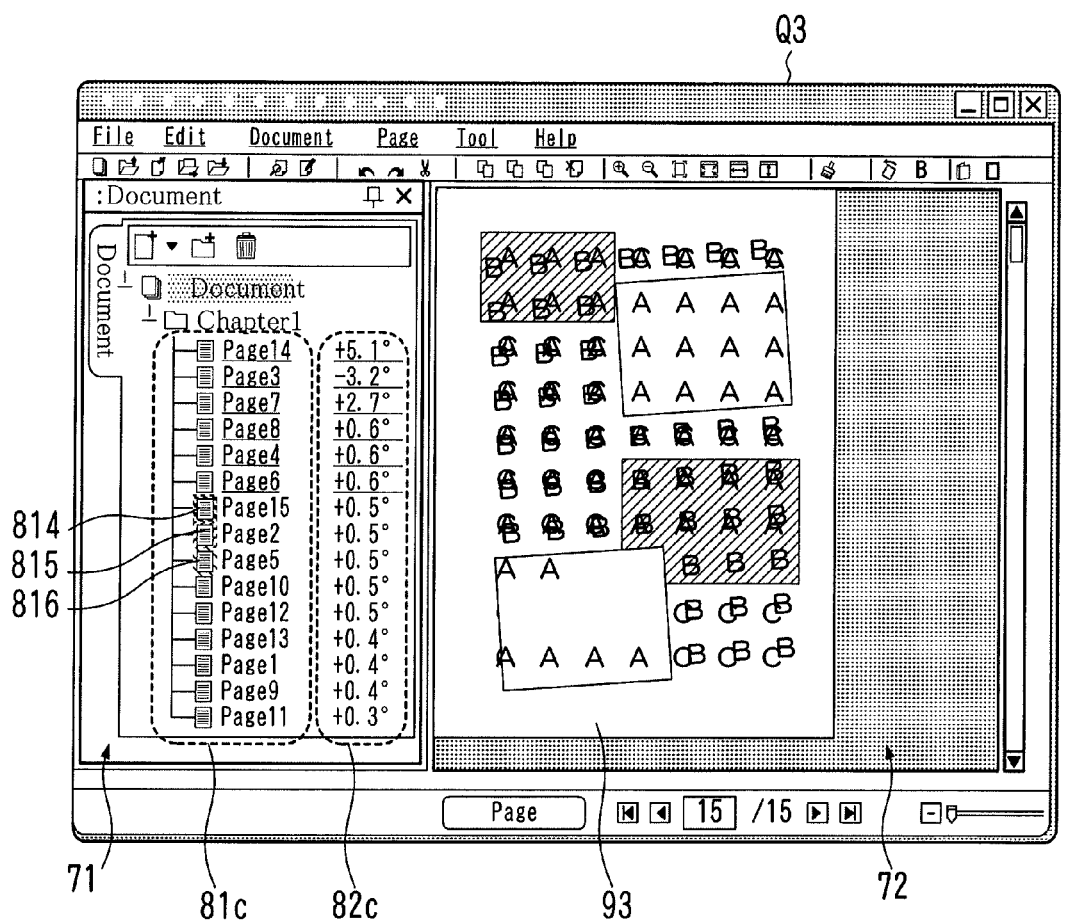
FIG. 9 is a diagram illustrating an example of display made on an operational input screen when a user enters the result of determination of an inclination correction process on images of some pages.
Figure 10:
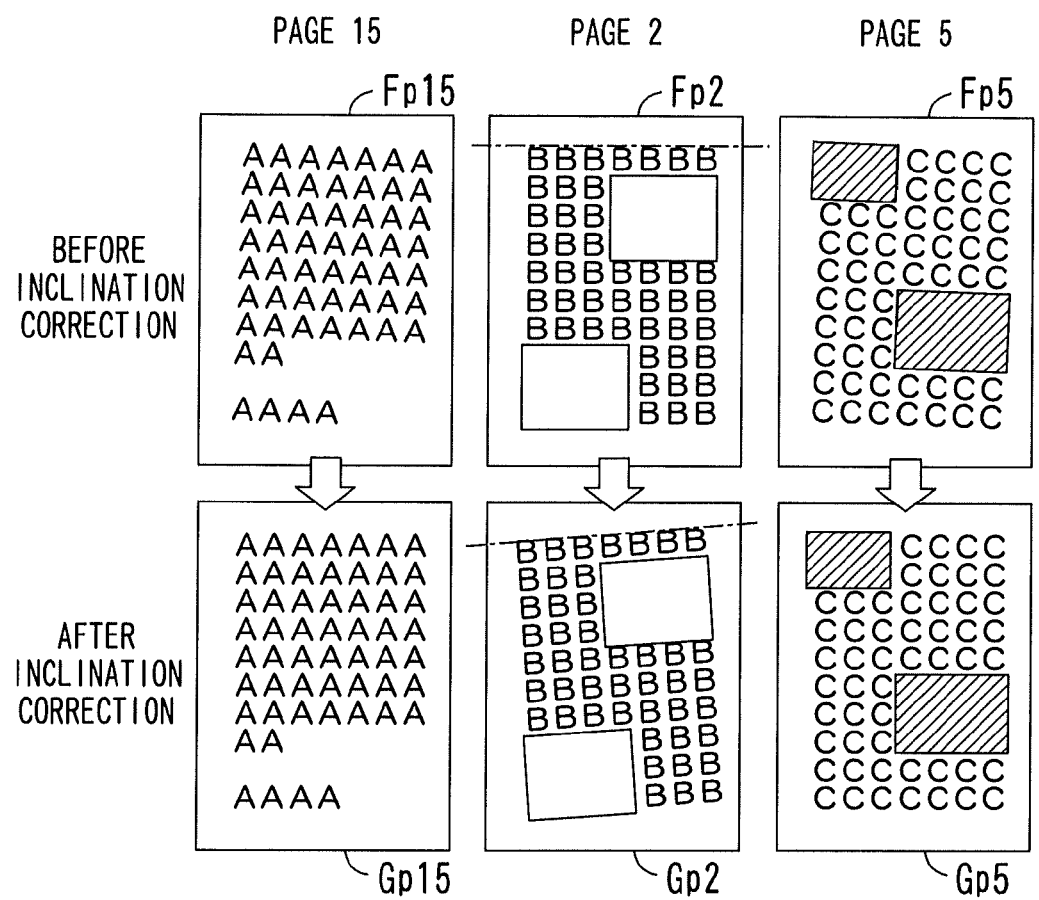
FIG. 10 is a diagram illustrating an example of a geometrical arrangement of images of a plurality of pages corresponding to the example of FIG. 9.

The transmissive composite image 93 shown in FIG. 9 is a combination of images Gp15, Gp2, and Gp5 exemplarily illustrated in FIG. 10. The images Gp15, Gp2, and Gp5 are images as a result of the inclination correction process on the images Fp15, Fp2, and Fp5, respectively. In the illustrated example, the inclination correction process is performed appropriately on the images of pages 15 and 5. However, the inclination correction process is not performed appropriately on the image of page 2. That is, the image Gp2 that has been subjected to the inclination correction process is inclined, while the image Fp2 before the inclination correction process is not inclined.

In the case where the user determines that it is necessary to perform an inclination correction process once again on a certain page, for example, he/she clicks on a character string 756 in the context menu 75 shown in FIG. 8 to set "re-correction required" for the page. Then, the user instructs the image processing apparatus 2 to perform an inclination correction process once again on the page after he/she has finished checking all the pages, or while he/she is checking the same. Responding to this, an operational input screen (not shown) for prompting the user to enter a degree of inclination correction is displayed. The degree may be entered by inputting the value of an inclination correction angle, or by specifying a target image element for detecting an inclination.

Figure 11:
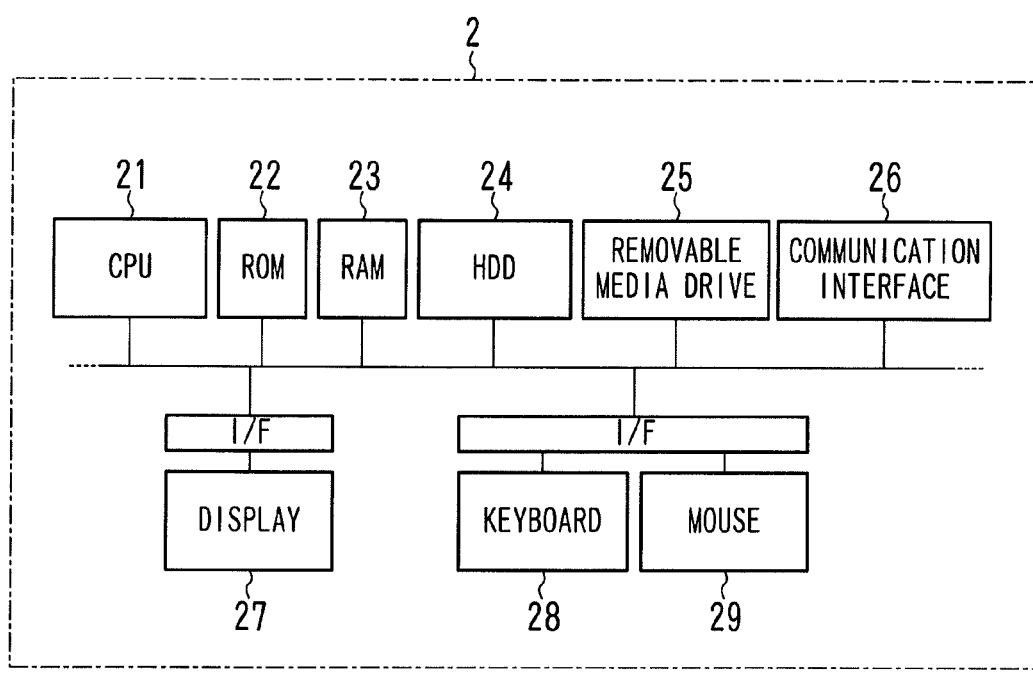
FIG. 11 is a diagram illustrating an example of the hardware configuration of a personal computer functioning as an image processing apparatus.

The image processing apparatus 2 is implemented by the hardware configuration of a common personal computer shown in FIG. 11. The personal computer is configured of a CPU 21 for executing a variety of programs, a ROM 22 for storing thereon a control program, a RAM 23 used as a work area for executing programs, and a hard disk drive 24 serving as a storage device. The personal computer also has a removable media drive 25 for accessing a CD-ROM or a DVD, and a communication interface 26 for connecting to a network. The personal computer is also provided with the display 27, the keyboard 28, and the mouse 29 all of which are human interface devices.

Figure 12:
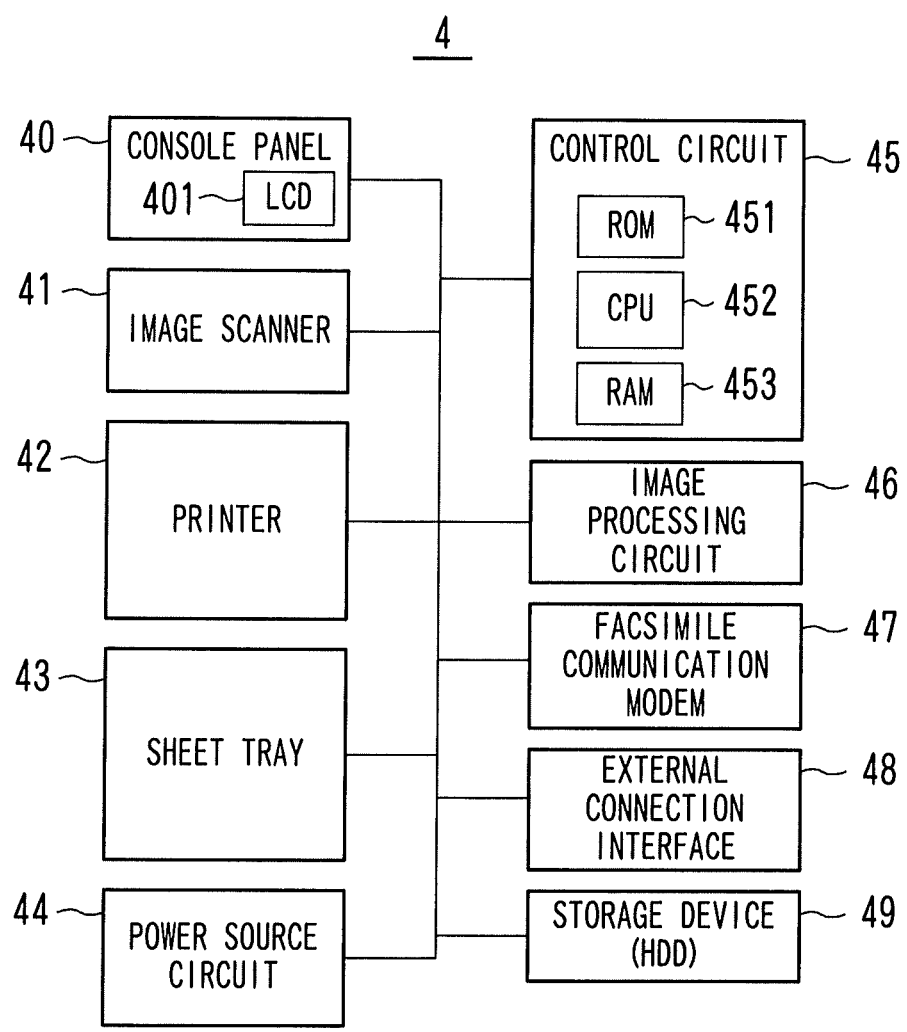
FIG. 12 is a diagram illustrating an example of the hardware configuration of a multifunction device provided with a scanner.

The multifunction device 4 in the image processing system 1 has the hardware configuration shown in FIG. 12. The multifunction device 4 includes a console panel 40, an image scanner 41, a printer 42, a sheet tray 43, a power source circuit 44, a control circuit 45, an image processing circuit 46, a facsimile communication modem 47, an external connection interface 48, and a storage device 49. The console panel 40 is provided with a Liquid Crystal Display (LCD) 401. The image scanner 41 is capable of scanning a color document. The printer 42 is provided with a unit for duplex printing, and is operable to print a monochrome or color image on a single side or both sides of paper supplied from the multiple-stage sheet tray 43. The power source circuit 44 supplies necessary power to any portions of the multifunction device 4. The control circuit 45 is configured of a ROM 451 for storing thereon a control program, a CPU 452 for executing a control program, and a RAM 453 used as a work area for executing programs. The image processing circuit 46 performs a variety of processes including a process of converting a copied document or a printed material into a bitmap image. The facsimile communication modem 47 is used in communication through the public line 7. The external connection interface 48 is used for connection to a LAN cable. The storage device 49 is a mass storage device such as a hard disk drive. The storage device 49 is provided with a memory area in which data regarding control of the multifunction device 4 is stored, and a memory area in which a variety of document files are retained, i.e., a so-called box.

In the embodiment described above, not only images that have been subjected to inclination correction but also degrees of inclination correction on images of individual pages are shown to a user as reference information for checking whether or not an inclination correction process is performed appropriately. The user can determine, based on degrees of inclination correction displayed in the form of a list, a trend in processing on image data of a plurality of pages, and also determine whether or not there is a page having a very high degree of inclination correction, or a page that has been subjected to correction in a direction different from the direction of inclination correction on the other pages. The user can know, for example, a situation where images are wholly inclined one degree to the right in inclination correction, or a situation where a rotation angle is large only in a certain page.

As discussed above, an icon corresponding to a page having a higher degree of inclination correction is displayed in such a manner to be presented in a color different from those of the other icons. This enables the user to quickly identify a page on which an inappropriate automatic correction process is highly likely to be performed. Further, transmissive display allows the user to check images of a plurality of pages at one time.

Since icons corresponding to pages are sorted in order of decreasing difference from a page having a higher difference and the sorted icons are displayed, the user can check images of pages in order from a page on which an inappropriate automatic correction process is highly likely to be performed. Further, the user can finish checking images at any point of time. To be specific, the user checks images displayed as a transmissive composite image in order starting from an image of the top-most page. Then, when the user confirms that a shift between an image of a closer page and an image of a farther page is reduced, and that there is no or little shift therebetween, he/she finishes checking the images. Thereby, the operating time can be reduced.

The user arbitrarily selects a plurality of pages from among all the pages by himself/herself and such selected pages are displayed in a transmissive manner. The user thus can regard a specific page as the reference page, and determine whether or not an inclination correction process made on another page is appropriate referring to the reference page.

In the embodiment discussed above, the number of pages automatically selected, as the target of transmissive display, by the page selection portion 204 is not limited to three, but may be two, or four or more. Preferably, however, the number of pages is so set that the user can easily identify pages corresponding to a transmissive composite image. Colors of icons and images constituting a transmissive composite image are design matters, and are not limited to the colors in this embodiment. The maximum number of pages displayed in the form of a list in the tree display area 71 depends on the area size. In the case where the number of pages of image data excesses a displayable number as a list, the maximum number of pages are displayed as a list, and a vertical scroll bar is also displayed. The user can know the total number of pages by scrolling through the display appropriately.

Another configuration of the image processing system 1 is possible in which a scanner and a personal computer are directly connected to each other via a cable. Yet another configuration is possible in which an image processing program for implementing the image processing apparatus 2 is incorporated into the multifunction device 4, and the user checks the result of an inclination correction process with the console panel 40 of the multifunction device 4.

In the embodiment discussed above, an inclination correction process is exemplified as image processing. The present invention is applicable to an apparatus or a system that performs another image processing by employing a transmissive composite display technique to display the result of image processing on images of a plurality of pages immediately and at once. Examples of another image processing include flip vertical, flip horizontal, and margin adjustment, all of which are to approximate the geometrical arrangement of an image to a predetermined appropriate geometrical arrangement. The appropriate geometrical arrangement based on the flip vertical is a geometrical arrangement in which an image is vertically rotated around its own center. The appropriate geometrical arrangement based on the flip horizontal is a geometrical arrangement in which an image is horizontally rotated around its own center. The appropriate geometrical arrangement based on the margin adjustment is a geometrical arrangement in which a specified amount of margin is provided on paper.

The embodiment discussed above makes it possible to reduce a burden on an operator who visually confirms whether or not image processing is performed appropriately on images of a plurality of pages.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing system comprising:
a scanner for scanning an image depicted on paper; and
an image processing apparatus connected to the scanner so that data communication with the scanner is performed,
wherein the image processing apparatus includes:
  an image processor that corrects images of a plurality of pages of image data obtained by scanning with the scanner in such a manner that a geometrical arrangement of the images is approximated to a predetermined appropriate geometrical arrangement;
  a display configured to display any images; and
  a display controller that controls the display to display a list of information indicating degrees of correction to be performed by the image processor on the individual pages of the image data and icons representing pages,
  wherein the display controller controls the display in which the list of the information and the icons representing pages are displayed to display images of two or more selected pages one above another in such a manner that the images are displayed in different colors on a page-by-page basis, and the image of a farther page is visible through a background portion of a closer page.

2. An image processing method for performing image processing on image data including a plurality of pages, the image processing method comprising:
correcting images of the individual pages of the image data in such a manner that a geometrical arrangement of the images is approximated to a predetermined appropriate geometrical arrangement; and
displaying a list of information on a display, the information indicating degrees of correction to be performed by an image processing portion on the individual pages of the image data;
wherein the displaying includes displaying the list by arranging the information and icons representing pages in order of magnitude of the degrees.

3. The image processing method according to claim 2, wherein information indicating a degree higher than a set value and an icon corresponding to said information are displayed in a color different from that of information indicating another degree and different from that of another icon.

4. An image processing method for performing image processing on image data including a plurality of pages, the image processing method comprising:
correcting images of the individual pages of the image data in such a manner that a geometrical arrangement of the images is approximated to a predetermined appropriate geometrical arrangement;
displaying a list of information and icons representing pages on a display, the information indicating degrees of correction to be performed by an image processing portion on the individual pages of the image data; and
displaying, on the display in which the list of the information and the icons representing pages are displayed, images of two or more selected pages one above another in such a manner that the images are displayed in different colors on a page-by-page basis, and the image of a farther page is visible through a background portion of a closer page.

5. A non-transitory computer-readable storage medium storing thereon a computer program used in a computer provided in an image processing apparatus for performing image processing on image data including a plurality of pages, the computer program causing the computer to function as:
an image processor that corrects images of the individual pages of the image data in such a manner that a geometrical arrangement of the images is approximated to a predetermined appropriate geometrical arrangement; and
a display controller that controls a display to display a list of information indicating degrees of correction to be performed by the image processor on the individual pages of the image data by arranging the information in order of magnitude of the degrees.

6. The non-transitory computer-readable storage medium according to claim 5, wherein, when the display controller controls the display to display the list of the information, information indicating a degree higher than a set value and an icon representing a page corresponding to said information are displayed in a color different from that of information indicating another degree and different from that of an icon representing another page.

7. A non-transitory computer-readable storage medium storing thereon a computer program used in a computer provided in an image processing apparatus for performing image processing on image data including a plurality of pages, the computer program causing the computer to function as:
an image processor that corrects images of the individual pages of the image data in such a manner that a geometrical arrangement of the images is approximated to a predetermined appropriate geometrical arrangement; and
a display controller that controls a display to display a list of information indicating degrees of correction to be performed by the image processor on the individual pages of the image data by arranging the information in order of magnitude of the degrees;
the computer program causing the display controller to display on the display on which the list of information is displayed images of two or more selected pages one above another in such a manner that the images are displayed in different colors on a page-by-page basis, and the image of a farther page is visible through a background portion of a closer page.

8. An image processing apparatus for performing image processing on image data including a plurality of pages, the image processing apparatus comprising:
an image processor that corrects images of the individual pages of the image data in such a manner that a geometrical arrangement of the images is approximated to a predetermined appropriate geometrical arrangement;
a display configured to display any images; and
a display controller that controls the display to display a list of information indicating degrees of correction to be performed by the image processor on the individual pages of the image data and icons representing pages;

wherein the display controller controls the display in which the list of the information and the icons representing pages are displayed to display images of two or more selected pages one above another in such a manner that the images are displayed in different colors on a page-by-page basis, and the image of a farther page is visible through a background portion of a closer page.

9. An image processing apparatus for performing image processing on image data including a plurality of pages, the image processing apparatus comprising:

an image processor that corrects images of the individual pages of the image data in such a manner that a geometrical arrangement of the images is approximated to a predetermined appropriate geometrical arrangement;

a display configured to display any images; and a display controller that controls the display to display a list of information indicating degrees of correction to be performed by the image processor on the individual pages of the image data;

wherein the display controller controls the display to display the list by arranging the information and icons representing pages in order of magnitude of the degrees.

10. The image processing apparatus according to claim 9, wherein the display controller controls the display to display information indicating a degree higher than a set value and an icon corresponding to said information in a color different from that of information indicating another degree and different from that of another icon.

11. An image processing system comprising:

a scanner for scanning an image depicted on paper; and an image processing apparatus connected to the scanner so that data communication with the scanner is performed, wherein the image processing apparatus includes:

an image processor that corrects images of a plurality of pages of image data obtained by scanning with the scanner in such a manner that a geometrical arrangement of the images is approximated to a predetermined appropriate geometrical arrangement, a display configured to display any images, and a display controller that controls the display to display a list of information indicating degrees of correction to be performed by the image processor on the individual pages of the image data, wherein the display controller controls the display to display the list by arranging the information and icons representing pages in order of magnitude of the degrees.

12. The image processing system according to claim 11, wherein the display controller controls the display to display information indicating a degree higher than a set value and an icon corresponding to said information in a color different from that of information indicating another degree and different from that of another icon.

* * * * *